(12) United States Patent
Lakshman et al.

(10) Patent No.: US 7,715,382 B2
(45) Date of Patent: May 11, 2010

(54) SOFTROUTER

(75) Inventors: Tirunell V. Lakshman, Morganville, NJ (US); Thyagarajan Nandagopal, Middletown, NJ (US); Ramachandran Ramjee, Summit, NJ (US); Krishan K. Sabnani, Westfield, NJ (US); Thomas Y. Woo, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 913 days.

(21) Appl. No.: 11/147,642

(22) Filed: Jun. 8, 2005

(65) Prior Publication Data

US 2006/0092974 A1    May 4, 2006

Related U.S. Application Data

(60) Provisional application No. 60/623,885, filed on Nov. 1, 2004.

(51) Int. Cl.
*H04L 12/56* (2006.01)
(52) U.S. Cl. ..................................... 370/389
(58) Field of Classification Search ................ 370/351, 370/389; 709/230, 238
See application file for complete search history.

(56) References Cited

U.S. PATENT DOCUMENTS

| | | | |
|---|---|---|---|
| 6,633,560 B1 | 10/2003 | Albert et al. | |
| 6,912,197 B2 | 6/2005 | Mahamuni | |
| 7,069,343 B2 | 6/2006 | Goringe et al. | |
| 7,075,904 B1 | 7/2006 | Manish et al. | |
| 7,194,653 B1 | 3/2007 | Hadders et al. | |
| 7,286,468 B2 | 10/2007 | Scudder et al. | |
| 7,324,439 B2 | 1/2008 | Loo | |
| 2002/0191250 A1 | 12/2002 | Graves et al. | |
| 2003/0069975 A1* | 4/2003 | Abjanic et al. | ............... 709/227 |
| 2004/0264384 A1 | 12/2004 | Deval et al. | |
| 2005/0050136 A1 | 3/2005 | Golla | |
| 2005/0190783 A1 | 9/2005 | Khosravi | |
| 2005/0254438 A1 | 11/2005 | Turk et al. | |

OTHER PUBLICATIONS

Chan, Vien et al. "Control Plane Platform Development Kit (CP-PDK)—Integrating Control Plane and Data Plane" Intel Corporation. Feb. 19, 2003.*
Louati, Wajdi et al. "Configurable software-based edge router architecture" 4th Workshop on Applications and Services in Wireless Networks. Aug. 2004.*
Yang, L. et al., "Forwarding and Control Element Separation (ForCES) Framework" The Internet Society. Apr. 2004.*

(Continued)

*Primary Examiner*—Derrick W Ferris
*Assistant Examiner*—Nihar Patel
(74) *Attorney, Agent, or Firm*—Wall & Tong, LLP

(57) ABSTRACT

The SoftRouter architecture separates the implementation of control plane functions from packet forwarding functions. In this architecture, all control plane functions are implemented on general purpose servers called the control elements (CEs) that may be multiple hops away from the forwarding elements (FEs). A network element (NE) or a router is formed using dynamic binding between the CEs and the FEs. The flexibility of the SoftRouter architecture over conventional routers with collocated and tightly integrated control and forwarding functions results in increased reliability, increased scalability, increased security, ease of adding new functionality, and decreased cost.

8 Claims, 6 Drawing Sheets

SOFT ROUTER MODEL

OTHER PUBLICATIONS

Ansari, Furquan et al. "ForCES Element Bindings and Topology Discovery Protocol" Jul. 10, 2004.*

Gopal, Ram, "Seperation of control and forwarding plane inside a network element" High Speed Networks and Multimedia Communications 5th IEEE International Conference. Nov. 7, 2002. pp. 161-166.*

Ansari, Furquan et al. "Element Bindings and Topology Discovery Protocol" Aug. 24, 2004, Lucent Technologies. Slides 1-11. http://www.ieft.org/proceedings/04aug/slides/forces-5/index.html.*

Lin, Ying-Dar, et al. Multihop Wireless IEEE 802.11 LANs: A Prototype Implementation. Jan. 25, 2000. pp. 1-7.*

A. Lazar, "Programming Telecommunication Networks," IEEE Network, vol. 11, Sep./Oct. 1997, pp. 8-18.

S. Williams, "The Softswitch Advantage," IEE Review, vol. 48, Issue 4, Jul. 2002, pp. 25-29.

J. Rexford et al., "Network-Wide Decision Making: Toward A Wafer-Thin Control Plane," HotNets, 2004.

L. Yang et al., "Forwarding and Control Element Separation (ForCES) Framework," RFC 3746, 2004.

U.S. Appl. No. 11/147,472, filed Aug. 8, 2005, Ansari et al.
U.S. Appl. No. 11/147,665, filed Jun. 8, 2005, Ansari et al.
U.S. Appl. No. 11/147,937, filed May 8, 2005, Lakshman et al.
U.S. Appl. No. 11/147,768, filed Jun. 8, 2005, Lakshman et al.
U.S. Appl. No. 11/147,491, filed Jun. 8, 2005, Ansari et al.

Search Report in corresponding EP 05 25 6626, Jan. 26, 2006, Lucent Technologies, Inc.

Furquan Ansari Thyaga Nandagopal Lucent Tech Hormuzd Khosravi Intel Corp: "ForCES Element Bindings and Topology Discovery Protocol" IETF Standard-Working-Draft, Internet Engineering Task Force, IETF, CH, Jul. 10, 2004, XP015010189 ISSN: 0000-0004.

Kristian Gregersen: "IPv6 Unicast Forwarding Service API Implementation Agreement, Revision 2.0" Network Processing Group, 'Online May 26, 2004, pp. 1-11, XP002362393 Retrieved from the Internet: URL:HTTP://www.npforum.org/techinfo/IPv4_IA.pdf>'retrieved on Jan. 11, 2006.

Tal Avian et al: intelligent network services through active flow manipulation >> Intelligent Network Workshop, 2001 IEEE May 6-9, 2001, Piscataway, NJ, USA, IEEE, May 6, 2001, pp. 73-82, XP010538403 ISBN : 0-7803-7O47-3.

R et al: "Pre Association Phase Protocol (PAP) draft-nait-forces-pap-00.txt" IETF Standard-Working-Draft, Internet Engineering Task Force, IETF, CH, Jun. 2003, XP015004535 ISSN: 0000-0004.

Yang L et al: "RFC 3746: Forwarding and Control Element Separation (ForCES) Framework" Forces Working Group, Apr. 2004, XP002323740.

R. Gopal et al., "ForwArding and Control ElemenT protocol (FACT)", Nov. 2003, IETF Draft (draft-gopal-forces-fact-06.txt).

J. Moy, "OSPF Version 2", Apr. 1998, IETF RFC 2328.

Forwarding and Control Element Separation (ForCES) Framework, RFC 3746 by Yang et al. Apr. 30, 2004.

L. Yang et al., "Forwarding and control Element Separation (ForCES) Framework", Network Working Group Request for Comments; 3746, Apr. 2004.

Ansari et al., "element Bindings and Topology discovery Protocol—(Slides)".

Lin et al., "MuItihop Wireless IEEE 802.11 LANs", 1999 IEEE Int. Conf., vol. 3, pp. 1568-1572.

Ram Gopal, "Separation of Control and Forwarding Plane Inside a Network Element", 2002 IEEE.

Furquan Ansari et al., "ForCES Element Bindings and Topology Discovery Protocol", Jul. 2004.

V.Chan et al., "Control Plane Platform Development Kit," Intel Developer Forum, Spring 2003.

* cited by examiner

SOFTROUTER

CROSS-REFERENCES

The present application claims the benefit of provisional application No. 60/623,885, entitled "SoftRouter: Router Disaggregation," filed Nov. 1, 2004. In addition, the present application is related to copending applications Ser. No. 11/147,472, entitled "SoftRouter Protocol Disaggregation," Ser. No. 11/147,665, entitled "SoftRouter Protocol Failovers," Ser. No. 11/147,937, entitled "SoftRouter Separate Control Network," Ser. No. 11/147,768, entitled "SoftRouter Feature Server," Ser. No. 11/147,491,entitled "SoftRouter Dynamic Binding Protocol," which were filed on the same date as the present application, Jun. 8, 2005. The provisional and related applications are incorporated herein by reference in their entireties.

FIELD OF THE INVENTION

The present invention relates generally to the field of networking and, in particular, relates to router disaggregation.

BACKGROUND OF THE INVENTION

In conventional router architectures, there is close integration of the forwarding and control plane implementations. In a typical router, a group of forwarding elements and a switch fabric are controlled by control plane software running on a controller card in the same chassis or on a co-located chassis. The forwarding elements are statically associated with the control elements that run the control plane software. The control processors implementing control plane functions are collocated with the line cards that implement forwarding functions and often share the same router backplane. Communication between the control processors and the forwarding line card is not based on any standards-based mechanism, making it impossible to interchange control processors and forwarding elements from different suppliers. This also leads to a static binding between forwarding elements and line cards. A route typically has at most two controllers (live and stand-by) running control plane software. Each line card is statically bound to these two controllers. The two controllers, the line cards to which they are statically bound, and the switch fabric together constitute the router.

There is a need for a new router architecture that disaggregates the forwarding and control planes and dynamically associates forwarding elements and control elements.

SUMMARY

Various deficiencies of the prior art are addressed by the present invention of a network and router architecture, which has many embodiments.

One embodiment of the network and router architecture includes a route controller component and a transport and packet forwarding component that is separate from the route controller. A binding protocol binds the route controller component to the transport and packet forwarding component. Once binding is established, the route controller component communicates with the transport and packet forwarding component via a control protocol.

Another embodiment is a network and router architecture including a number of forwarding elements (FEs) for packet forwarding and a number of control elements (CEs) that are separate from the FEs. The CEs configure, control, and provide routing information to the FEs via a standard protocol. Each CE controls multiple FEs so that there are fewer CEs than FEs.

Yet another embodiment is a network and router architecture including a control plane space, a data plane space, and a control/data channel between them. The control plane space is for running a plurality of control elements and attribute table managers. The data plane space is for running a plurality of forwarding elements. The data plane space is physically and logically separate from the control plane space.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
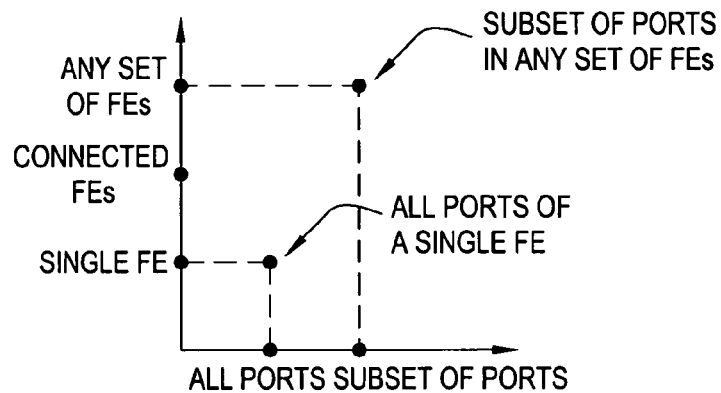
FIG. 1 is a chart showing network element (NE) possibilities.

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, such as those using open systems interconnection (OSI) layers, bridging protocols, many other protocols, traffic management, optical, edge/core routing, wireless, cable, data centers, fault management, configuration management, accounting management, performance management, security management, other network management, enterprise, government, military applications, and many other different kinds of networking characteristics and applications.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses. Other historical examples of disaggregation include class 5 voice switch versus softswitch/media gateway and mainframe versus personal computer (PC).

Definitions

Control element (CE): the CE is a logical, addressable entity providing layer 3 control functionality for the purpose of packet forwarding. A CE controls one or multiple forwarding elements (FEs) belonging to the same network element (NE). A CE is associated with exactly one NE and a NE has exactly one CE. A NE may have multiple distributed, redundant subcomponents to implement the control functionality. A CE utilizes a single or multiple physical control elements (PCEs).

Forwarding element (FE): the FE is a logical, addressable entity providing layer 3 packet forwarding functionality. A FE is controlled by exactly one CE. A FE can only be associated with exactly one CE and NE at a given point in time. The FE's control may be migrated to a different CE. (This means that a FE will move to a different NE). A FE and CE may be separated by multiple hops. A FE is able to process protocols for communication with its CE and for FE discovery. A NE router interface is only served by exactly one FE. Internet protocol time-to-live (IP TTL) and IP options may be modified on a per FE granularity.

Network element (NE): the NE is a logical entity performing the traditional layer 3 routing functionality. An NE usually has one CE and a number of FEs. FEs and CE of the same NE may be separated by multiple hops. IP TTL and IP options may be modified on a per FE granularity. This means that the data plane sees a NE as multiple hops whereas the control plane sees a NE as a single hop.

Physical control element (PCE): a hardware platform that implements layer 3 router control functions. A PCE may host partial CEs (CE subcomponents) or multiple CEs.

Physical forwarding element (PFE): PFE is a hardware platform that implements layer 3 packet forwarding functionality. A PFE may host multiple FEs, but not partial FEs.

External link: external links are layer 3 packet-forwarding links that leave the packet-forwarding plane of a NE to connect with neighboring NEs.

Internal link: internal links are layer 3 packet-forwarding links that interconnect FEs of the same NE. The link between FEs and CE are not internal links.

Control link: control links interconnect CEs with FEs. Direct control links connect CEs with FEs without any intermediate FEs or NEs. Indirect control links span intermediate FEs and NEs.

Pre-association phase: the pre-association phase is the period of time during which the association of FEs and CEs to PFEs and PCEs is established, respectively, and during which it is determined which FEs and CE belong to a NE.

Post-association phase: the post-association phase is the period of time during which FEs and CEs know their mutual binding and establish communication.

SoftRouter Architecture

An exemplary SoftRouter architecture is a control plane architecture that separates the implementation of control plane functions from packet forwarding functions (disaggregation concept). There are many possible embodiments of this exemplary SoftRouter architecture having various combinations of features. In the exemplary SoftRouter architecture, all control plane functions are implemented on general purpose servers (a/k/a controllers) called the control elements (CEs). CEs may be multiple hops away from the line cards or FEs (FEs). There is no static association between the CEs and the FEs. Each FE, when it boots up, discovers a set of CEs and the FEs. The FE dynamically binds itself to a best CE from a discovered set of CEs. In the exemplary SoftRouter architecture, a collection of FEs, their switch fabrics, and their associated CEs is called a network element (NE) and logically constitutes a router. A standard interface is used between the CEs and FEs. Embodiments of the exemplary SoftRouter architecture include a number of different network entities and protocols between them.

The exemplary SoftRouter architecture has two different views: a physical view and a routing view.

In the physical view, the exemplary SoftRouter architecture is made up of nodes interconnected by links. There are two types of nodes, the FEs and the CEs. An FE may have multiple line cards (each in turn terminating multiple ports—physical or logical) and a backplane (switch fabric) that shuttles data traffic from one line card to another. Unlike traditional routers, FEs do not have sophisticated control logic (e.g., a routing process like open shortest path first (OSPF)) running locally. Instead, the control logic is hosted at CEs, which include general purpose server machines. A link connects any two elements (FEs/CEs). Typically, an FE has multiple incident links so that data traffic can be routed from one link to another. A CE is multi-homed to more than one FE so that it is not disconnected from the network should its only link fail. The physical view of the exemplary SoftRouter architecture includes a few multi-homed CEs.

An FE switches data traffic between its links. The nature of the switching function may take different forms. Among others, forms include packet forwarding, label switching, and optical switching. Packet forwarding includes both layer 2 (media access control (MAC)-based switching) and layer 3 (longest prefix match) forwarding. An example of label switching is multiprotocol label switching (MPLS) forwarding, where the data path forwarding function can include label swapping, pushing, and popping. For optical switching, the traffic can be time-switched, wavelength-switched, or space-switched among the links. In each of these cases, the switching function is driven by a simple local table that is computed and installed by a particular CE on the network. In some embodiments, an FE does more than switching. For example, an FE can perform security functions such as packet filtering and intrusion detection. These functions work off a local data structure with management intelligence residing in a remote CE. For example, in the packet filtering case, the filtering logic consults only a local filter table. The management of the local filter table (e.g., insertion and deletion of filtering rules) is performed in some remote CE.

The routing view of the exemplary SoftRouter architecture captures the topology of the network as seen by the routing control logic. At a high level, a NE is a logical grouping of network ports and the respective CEs that manage those ports. A port cannot belong to more than one NE. By placing different restrictions on what network ports can be grouped together, the allowable NE varies.

FIG. 1 is a chart showing NE possibilities. There are two dimensions where restrictions can be placed. The vertical dimension restricts the selection of FEs. Single FE means that the network ports in a NE are from a single FE. Connected FEs means the ports can be selected from a set of FEs that are connected (i.e., there exists a physical path from one FE to another). Any set of FEs means the ports can come from any set of FEs. The horizontal dimension specifies whether an NE must include all ports of the FEs under consideration or if it can include only a subset. Any combination of the two dimensions provides a possible definition of the ports of an NE. We say that two NEs are logically connected if they contain ports belonging to FEs that are physically connected.

To illustrate these definitions better, two specific cases are examined that represent the two extremes of the spectrum enabled by this definition.

The first case is a subset of ports in any FEs. Any ports from any FEs can be grouped as part of a single NE. The routing view can be significantly different from the physical view. This definition can be useful for network-based virtual private network (VPN) applications. The different ports in an NE represent the different sites in a wide-area VPN. By logically collapsing them as part of a single NE in the routing view, this view provides a separation between the intra-VPN routing from the inter-VPN routing.

The second case is all ports in a single FE. Each FE is part of one NE. The physical and the routing views become identical. With this definition, the only difference between traditional router architecture and an exemplary SoftRouter architecture is the offloading of the routing logic onto remote CEs.

This all ports in connected FEs case represents the clustering of neighboring FEs into a single NE and corresponds to the typical case of several routers being connected back-to-back in a central office. From a routing perspective, this can provide significant simplification. First, the reduced number of NEs in the routing view reduces the inter-NE routing complexity. Second, a different (possibly less complex) routing protocol can be employed for intra-NE routing.

In the exemplary SoftRouter architecture, the routing control of the NEs is disaggregated from the FEs and the control protocol runs on the CEs. A binding between an FE and a CE means that the CE is performing particular control functions on behalf of the FE. Because multiple protocols (e.g., interior gateway protocol (IGP) and exterior gateway protocol (EGP), or even multiple instances of a protocol) may be required for the operation of an FE. An FE may have multiple CE bindings.

Figure 2:
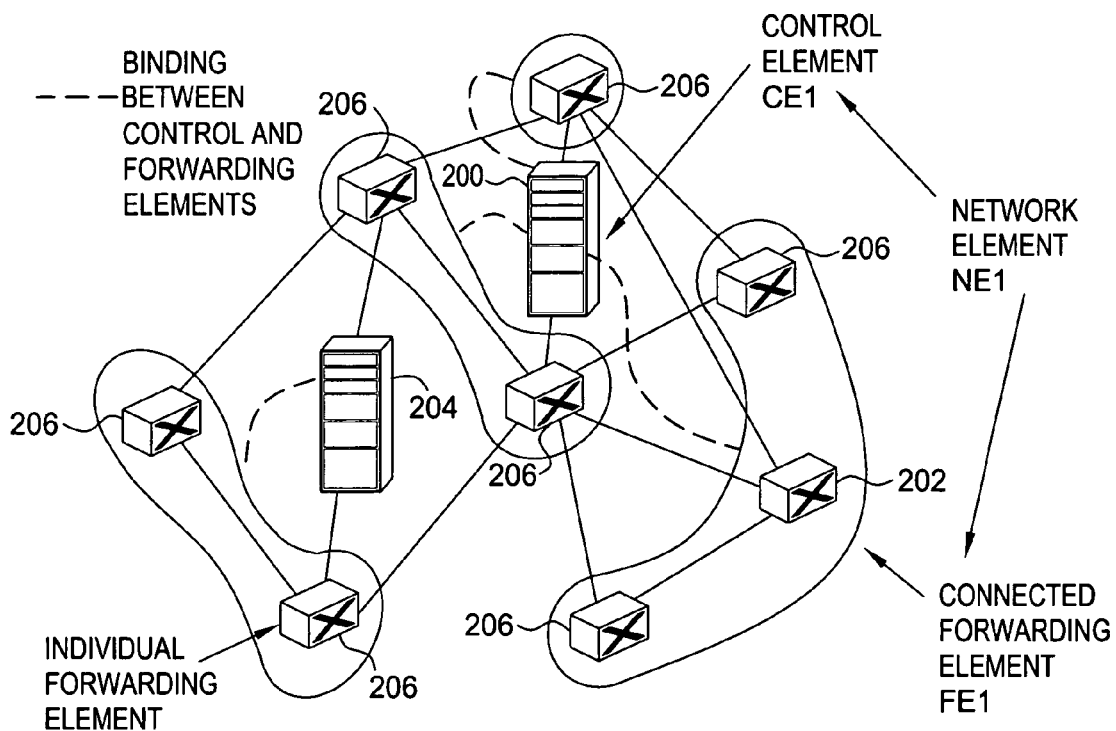
FIG. 2 is a diagram showing an embodiment of the exemplary SoftRouter architecture with all ports in connected forwarding elements (FEs)

FIG. 2 shows an embodiment of the exemplary SoftRouter architecture with all ports in connected FEs. In this embodiment of the exemplary SoftRouter architecture, there are two CEs 200, 204 and a number of FEs 202, 206. The dotted lines show binding between CEs 200, 204 and FEs 202, 206. A binding can exist between an FE 202, 206 and a CE 200, 204, even if they are not directly connected, e.g., CE1 200 and FE1 202. The exemplary SoftRouter architecture thus enables the creation of a separate (logically and physically) signaling network connecting all the CEs.

Protocols

Figure 3:
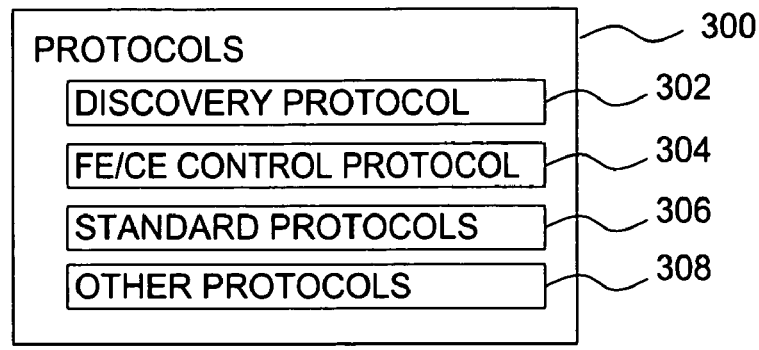
FIG. 3 is a block diagram showing protocols used in an embodiment of the exemplary SoftRouter architecture.

FIG. 3 shows protocols used in an embodiment of the exemplary SoftRouter architecture. These protocols 300 include a discovery protocol 302, an FE/CE control protocol, standard protocols 306, and other protocols 308.

A number of different protocols are used in the operation embodiments of the exemplary SoftRouter architecture, including a discovery protocol and a FE/CE control protocol. One protocol is the discovery protocol. In order for an FE to establish a binding with a CE, it first must know about the existence of the CE and be able to reach it using some route. The discovery protocol finds out what CEs are available and lays out paths to them for the FEs, which is described in greater detail below. Another protocol is the FE/CE control protocol. Once a binding is established, the FEs and the CEs communicate using the FE/CE control protocol. On the uplink (FE to CE) direction, the FE/CE control protocol tunnels any control packets received in any of the ports in the FE (e.g., all OSPF protocol packets if CE is running OSPF for the FE) and provides link state information (e.g., link up/down signal) to the CE. On the downlink direction, the FE/CE control protocol carries configuration and control information (e.g., enable/disable a link, forwarding information base (FIB)). The design of the FE/CE control protocol relates to the issues of frequency, bandwidth and delay needs for the FE/CE communication. The FE/CE control protocol may be designed using the ForCES protocol or any other type of protocol that addresses these issues.

In any given NE, the FEs are strongly connected (with the same underlying topology) and the CE can be many hops away from the corresponding forwarding set. This separation leads to many new scenarios and technical challenges that do not normally occur in existing networks. An integrated NE is a router in an existing network, where the CE and the corresponding FE are part of a single physical device.

Bootstrapping

In an integrated NE, the configuration pertaining to that NE is obtained upon bootup, because the control card on the box is in direct contact with the forwarding engine through a bus/interconnect. As soon as the router (NE) comes up, the forwarding engine knows how to obtain the configuration information immediately from the control processor.

In an embodiment of the exemplary SoftRouter architecture, upon bootup, the forwarding engine obtains its configuration information, which includes the IP addresses of its interfaces, from a remote CE that resides on a server. This poses a potential paradox. In order to discover a CE and send packets to it, the FE requires routing information; however, the routing information is supposed to come from the CE. One way to address this issue is to have a separate protocol that enables discovery of CEs by FEs and vice-versa. The purpose of this protocol is to let FEs know of the available CEs in the network and to ensure that a FE always has a path to reach its corresponding CE, if available.

The discovery protocol is designed to be simple, because each FE is primarily a forwarding engine, with minimal software to update its FIB and to maintain association with its CE. Moreover, the FE may not even have its own layer 3 address. In one embodiment, a unique string is assigned as an identifier for an FE (FEID). While the CE knows its configuration upon bootup, for compatibility purposes the CE also has a unique string identifier (CEID) in the same way as a FE, in one embodiment. In one embodiment, the unique string is like a randomly chosen private IP address specific to the NE. Any FE that is one hop away from a CE discovers the CE by listening to a status broadcast message from the CE. This FE then propagates this information to its neighbors along with a source-route to the particular CE with the source-route specified in terms of the unique string identifiers. Thus, the reachability information for each CE is propagated in a wave-like fashion to the entire NE. When a FE receives routes to a set of CEs, the FE chooses one CE and uses the advertised source-route to contact the CE with its local capability information. The CE configures the FE with the relevant addressing and FIB database information that enables the FE to begin packet forwarding.

Figure 4:
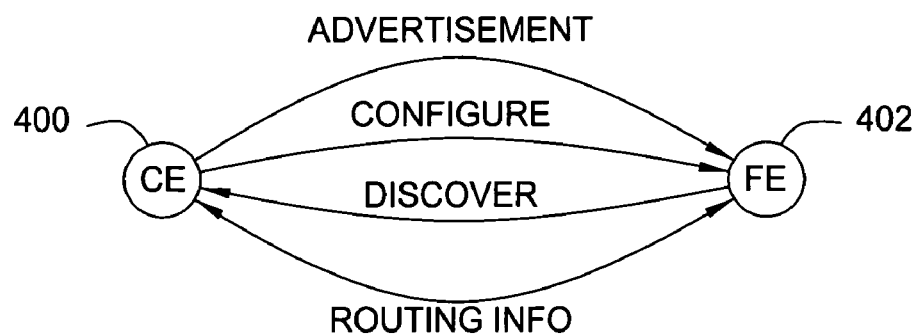
FIG. 4 is a block diagram showing exemplary communication between a CE and a FE in an embodiment of the exemplary SoftRouter architecture.

FIG. 4 shows exemplary communication between a CE and a FE in an embodiment of the exemplary SoftRouter architecture. A CE 400 configures a FE 402, the CE 400 advertises itself to the FE 402, the FE 402 discovers the CE 400, and the CE 400 shares routing information with the FE 402.

One embodiment of the exemplary SoftRouter architecture includes the following assumptions. Any CE in a given NE is able to configure any FE with the NE. The CE is nearly always willing to handle the routing functionality on behalf of a given FE in the NE, regardless of system load and congestion level. The CE is nearly always available; in other words, the CE rarely, if ever fails at all. The source-route to a particular CE is available the entire time when the configuration of an FE by the CE is ongoing. The CE trusts the FE and vice-versa. Discovery protocol packets may be overheard by nodes adjacent to, but not within the NE, without causing irreparable harm to the functioning of the embodiment of the exemplary SoftRouter architecture.

In various other embodiments of the exemplary SoftRouter architecture, one or more of these assumptions are relaxed, adding to the complexity of the discovery protocol, with more features and protocol messages needed. However, these are not disabling assumptions and may be addressed while keeping the discovery protocol simple enough.

Routing and Forwarding

Because the FEs are simple with minimal control on-board, the CE is responsible for maintaining the knowledge of the links status between FEs within the same NE. In addition, the CE also integrates topology changes within the NE with external (inter-NE) route changes and updates the FIBs of individual FEs accordingly.

Due to the difference between the physical view and the routing view, IP TTL and IP options behavior might deviate from the traditional router architecture, which assumes geographical closeness of control and forwarding planes. In an embodiment of the exemplary SoftRouter architecture, the FEs of a given NE are distributed over a large geographical area, making it expedient to decrement TTL and process IP options on a per FE basis (rather than a per NE basis). For an NE with co-located FEs, one can similarly realize this behavior or imitate traditional router behavior.

Moreover, a NE selects appropriate external routing metrics that suitably reflect the topology within the NE. The topology changes within the NE are caused not only by links going up or down, but also by FEs changing association to a different CE that may be in a different NE. Therefore, the hop count seen by the control plan differs from the one experienced by the data plane. The control plane sees hops on a per NE basis, whereas the forwarding plane potentially sees hops on a per FE basis.

Protocol Partitioning and Optimization

In standard internet routing protocols, there are various messages that fulfill different functions. For example, OSPF has hello packets to probe link status and various link-state advertisement (LSA) messages to advertise link status to the rest of the network. In an embodiment of the exemplary SoftRouter architecture, these messages are differentiated according to their purpose. In some embodiments, a FE forwards all received routing protocol packets to its CE and in other embodiments, the FE handles a subset of the protocol packets by itself without forwarding it to the CE, thereby reducing response time and control traffic in the network.

Consider the OSPF routing protocol as an example. Hello messages serve to discover the OSPF peering status of neighboring FEs. Instead of having the CEs originate the hello messages, it is possible for the FEs to exchange these messages between themselves (at the cost of violating the strict semantics of the hello message) and notify their respective CEs only when there is a change in the status of the FE peering status. On the other hand, LSA messages serve to advertise connectivity information to the rest of the network and, hence, these LSA messages originate from the CE and are exchanged between CEs.

In one embodiment of the exemplary SoftRouter architecture, routing protocols are optimized in terms of message overhead. In a traditional router network running OSPF, for example, LSA messages from each FE are flooded over the entire network. In this embodiment, LSAs are flooded only over the network of CEs. Given the potential difference in the magnitude of CEs and FEs, this reduces the number of OSPF messages sent over the network. Other embodiments include further optimization for various other protocols enabled by the exemplary SoftRouter architecture.

Failures and Load Balancing

Figure 5:
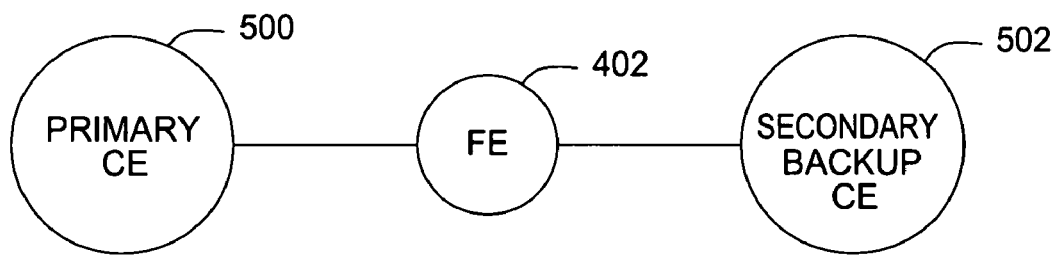
FIG. 5 is a block diagram showing a forwarding element (FE) with primary and secondary control elements (CEs) in an embodiment of the exemplary SoftRouter architecture.

FIG. 5 shows a FE with primary and secondary CEs in an embodiment of the exemplary SoftRouter architecture. The FE 402 has a primary CE 500 and, in case of failures, a secondary (a/k/a backup) CE 502.

By separating the CEs, more choices are provided for CEs to control a given FE. This choice comes at the risk of vulnerability to loss of CE connectivity due to both intermediate link and node failures in addition to failure or the CE itself. Aggregation of CEs aggravates the problem of CE failure, because a large number of FEs are left without a route controller.

Some embodiments of the exemplary SoftRouter architecture address this problem by using the standard server mechanisms for backup CEs. Each FE has a primary CE and a secondary CE set. When the discovery protocol or the control protocol signals a loss of association with the primary CE, the FE chooses a candidate from the secondary CE set to become its primary CE. The re-association is done using the same discovery protocol used for bootstrapping.

Apart from CE failures, a CE can voluntarily relinquish control of a FE for load balancing purposes. In that scenario, the CE either asks the FE to find another CE to manage it or guides the FE to a new CE. In the former, the new CE restarts the routing instance for the FE; while in the latter, the old CE transfers the FE's state to the new CE, resulting in a hot failover. The ability to load balance and recover quickly from control failures is a feature of some embodiment of the exemplary SoftRouter architecture.

When there is loss of association between a CE and a FE, the FE continues to forward packets, as long as there are no other topology changes in the NE, using its existing FIB. The discovery protocol discovers another CE in the meantime, thereby recovering from the loss of control.

These failure recovery processes are not limited to the choice of a single physical box as a NE, as in the existing networks. Embodiments of the exemplary SoftRouter architecture allow more flexibility in terms of the availability of CEs.

Benefits

Embodiments of the exemplary SoftRouter architecture have many benefits, including these five: 1) increased reliability, 2) increased scalability, 3) increased control plane security, 4) ease of adding new functionality, and 5) lower costs. There is increased reliability, because the reduced software in a FE makes that element more robust. As regards the CE, protocol-specific and independent mechanisms can be incorporated to enhance reliability. There is increased scalability, because CEs can be implemented on general-purpose servers and, thus, can be scaled up using well-established server scaling techniques. There is increased control plane security, because fewer management points makes it easier to manage and provide and strong defense around the CEs, thus making the overall network more secure. There is ease of adding new functionality, because adding new functionality is easier on a separate control server, executing on general purpose processors and operating systems. There are lower costs, because the exemplary SoftRouter architecture decouples the control and FEs, allowing economies of scale to reduce cost. Each of these benefits is discussed in more detail below.

Reliability

The separation of control and FEs in the exemplary SoftRouter architecture provides several reliability benefits. First, the reduced software in a FE implies that it is easier to make that element robust. On the control plane server side, sophisticated reliability enhancing mechanisms, such as automatic failover and the use of hot or cold standbys (discussed below) are implemented in various embodiments of the exemplary SoftRouter architecture. In some embodiments, a server has higher redundancy capabilities, such as 1:N failover capability rather than a limited 1:1 control blade failover capability of existing routers. Finally, the ability to host different protocols on different CEs implies that the failure of one CE does not render the corresponding FE useless (e.g., the failure of the CE hosting border gateway protocol (BGP) would still allow the FE to process OSPF protocol messages). Apart from these generic benefits that result in higher availability, we describe protocol-specific optimizations with respect to two exemplary protocols, BGP and OSPF. However, the present invention is not limited to these protocols.

Increased BGP Reliability

Figure 6B:
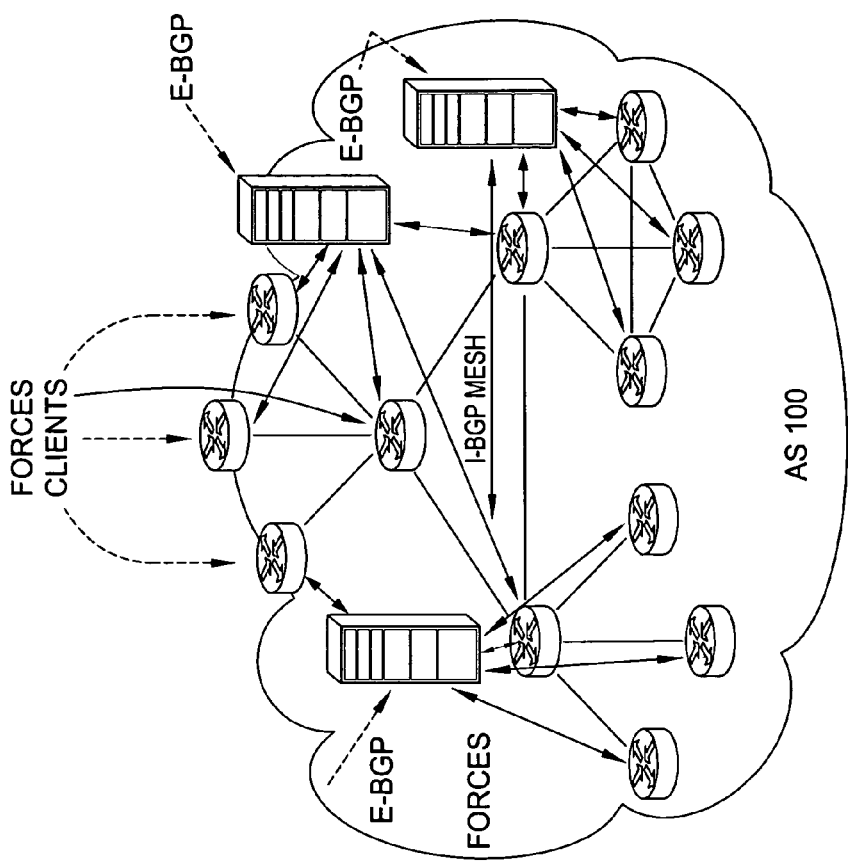
FIG. 6B is a diagram showing BGP deployment in an embodiment of the exemplary SoftRouter architecture.
Figure 6A:
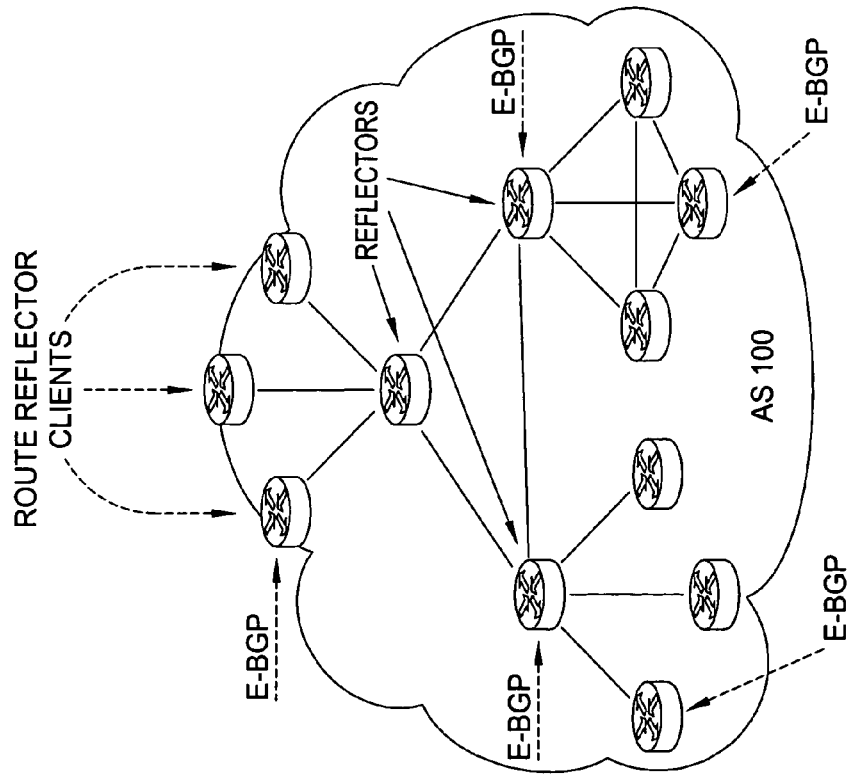
FIG. 6A is a diagram showing a typical deployment of border gateway protocol (BGP) with route reflectors in a large autonomous system (AS) in the prior art.

FIG. 6A shows a typical deployment of BGP with route reflectors in a large autonomous system (AS) in the prior art. This deployment has two main drawbacks. Specifically, under certain conditions, the network can go into persistent route oscillation where a subset of routers may exchange routing information without ever reaching a stable routing state. Another issue with the route reflector architecture is internal BGP (IBGP) reliability. While the failure of one IBGP session affects only two routers in the case of a full mesh IBGP architecture, the same failure of a session between two route reflectors could partition the network, resulting in lower reliability.

FIG. 6B shows BGP deployment in an embodiment of the exemplary SoftRouter architecture. The number of CEs that run BGP are typically at least an order of magnitude smaller than the number of routers (FEs). Thus, a full IBGP mesh can easily be maintained among the CEs. The CEs then download the appropriate forwarding tables to all the FEs using a standard protocol, such as the ForCES protocol. Thus, the persistent route oscillation problem is solved in this embodiment of the exemplary SoftRouter architecture, because there are no route reflectors. This increases the availability of the network.

Further, in this embodiment of the exemplary SoftRouter architecture, the IBGP mesh is between servers that can employ a higher degree of redundancy, such as 1:N (N>1) as compared to 1:1 redundancy on the control processors of the routers. Thus, BGP reliability in this embodiment of the exemplary SoftRouter architecture is improved over the prior art BGP deployments, where the CEs are multi-homed and there are multiple CEs in the network for failover.

In this embodiment of the exemplary SoftRouter architecture, the implementation of BGP is different than the prior art router control platform (RCP). Unlike RCP, the IGP protocol is also executing in the server. This embodiment uses a standard protocol, such as ForCES to communicate with the FEs rather than using IGP and IBGP as is the case in RCP. This simplifies the software on the FE. This embodiment uses an IBGP mesh between the CE servers inside a single AS.

Faster OSPF Convergence

OSPF convergence in the presence of failures is known to take tens of seconds in large networks today. This delay can have a significant impact on the availability of the network, especially for services such as voice over IP (VoIP). Compared to the 5 9's availability of the telephone network (about 3 minutes of downtime a year) today's data network can ill afford more than a couple of link failures before its availability falls below the 99.999% availability target. One embodiment of the exemplary SoftRouter architecture allows for faster OSPF convergence through several complementary techniques as follows. There is an order of magnitude fewer CEs for the same number of FEs, resulting in a smaller OSPF control network and faster convergence. This assumes that propagation delay from the FEs to the CEs is much smaller than the propagation delay of OSPF updates, which are governed by timers on the order of seconds. Control plane optimizations specific to embodiments described above allow faster convergence. Faster processors in this embodiment result in faster computations, such as shortest-path calculations. Thus, OSPF convergence time is reduced from tens of seconds, resulting in a highly available data network.

Scalability

Some of the limitations in scaling routing protocols in existing architectures are control processor capacity and on-board memory. The decoupling provided by the exemplary SoftRouter architecture makes it easier to upgrade control hardware that is based on general-purpose servers. Contrast this to the difficulty in obtaining an upgraded control processor card from a router manufacturer who needs to accommodate upgrades with other constraints such as power availability, slot availability, and the like.

This scalability advantage is highlighted in a specific example embodiment having an application of a highly scalable mobile IP home agent. The mobile IP home agent requires increasing scalability as cellular carriers introduce wireless data. There are two existing approaches to home agent scalability in the industry: using only routers and using only general purpose processors. However, both of these approaches have limitations.

Routers from major router vendors support several hundred thousand home agents, but signaling scalability is limited due to limitations of the control processor to about a hundred bindings/second (or less than two updates per hour per user). This is a significant limitation as updates generated through both mobility as well as the periodic refresh mechanisms can easily exceed two per hour per user. Mobile IP is typically implemented on a cluster of general purpose processors. Signaling scalability is not an issue here. However, scaling the number of home agents becomes difficult because IP Security (IPSec) processing (for each agent) is central processing unit (CPU)-intensive and will not scale efficiently to several hundred thousand home agents without specialized hardware.

An embodiment of the exemplary SoftRouter architecture includes a complementary combination of both of these approaches. It allows server-based signaling scalability, while retaining hardware-based transport scalability. Thus, transport is still handled by FEs with hardware support for IPSec using regular router blades, while signaling capacity is easily scaled up using multiple server blades.

Security

The exemplary SoftRouter architecture enables the adoption of a multi-fence approach to security with each fence adding a layer of security. These include an off-the-shelf versus special-purpose operating system, multi-blade server platform versus one or two control, fewer CEs, and a separate signaling network. Specialized operating systems are not as widely-tested for security holes. Overload due to malicious traffic can be distributed over a large number of processors and sophisticated compute-intensive intrusion detection mechanisms can be deployed. Managing fewer CEs is easier (e.g., changing security keys frequently) and, in some embodiments, these few elements are placed in a more secure environment (physically or logically firewalled) compared to the numerous FEs. Using a physically or logically separate signaling network for the Internet can limit attacks on control plane protocol messages.

In an embodiment of the exemplary SoftRouter architecture, the separation of control and FEs and the use of a few general purpose servers to host the control processes enable easier introduction of new network-based functionalities, such as quality of service support, traffic engineering, network-based VPN support, and the like. In applications with network-based VPN services using BGP/MPLS, a VPN server dynamically creates MPLS or IPSec tunnels among the provider edge routers. In prior art architecture, the VPN server executes on the router control board. Migrating the VPN server functionality into a CE in an embodiment of the exemplary SoftRouter architecture has several benefits over the prior art. VPN server upgrades are independently performed without impacting basic network operations, such as forwarding. Network-wide failover of VPN control servers is performed without impacting existing or new VPN sessions. Configuring BGP policies for the provider edge routers connected to the VPN customer sites is done in a central location at the VPN server, rather than at multiple routers (e.g., edge routers and route reflectors involved in the VPN. MPLS tunnels are engineered in a centralized manner to meet customer requirements. Scalability for support of a large number of VPNs is easily handled using generic server scaling techniques.

Cost

In the exemplary SoftRouter architecture, the FE is mostly hardware-based and requires little management. This allows economies of scale to help reduce the cost of each FE. In one embodiment, the individual router CE is consolidated into a few dedicated control plane servers. These CEs run on generic computing servers, rather than in specialized control processor cards in routers, as in the prior art. This allows sharing of control processor resources, resulting in better efficiency than the partitioning approach adopted in the prior art. Further, because the control plane servers are just another application for generic computing servers, the exemplary SoftRouter architecture leverages the CPU price-performance curve of these server platforms. Finally, the reduced number of control plane elements means fewer boxes to manage, thus reducing operating expenses.

In summary, the exemplary SoftRouter architecture separated the implementation of control plane functions from packet forwarding functions. The FEs are simple hardware devices with little intelligence and are controlled by CEs that might be multiple hops away. The exemplary SoftRouter architecture provides many benefits, including increased reliability, increased scalability, increased security, ease of adding new functionality and decreased cost. As data networks become increasingly deployed on data networks, these benefits will become more valuable.

Figure 7:
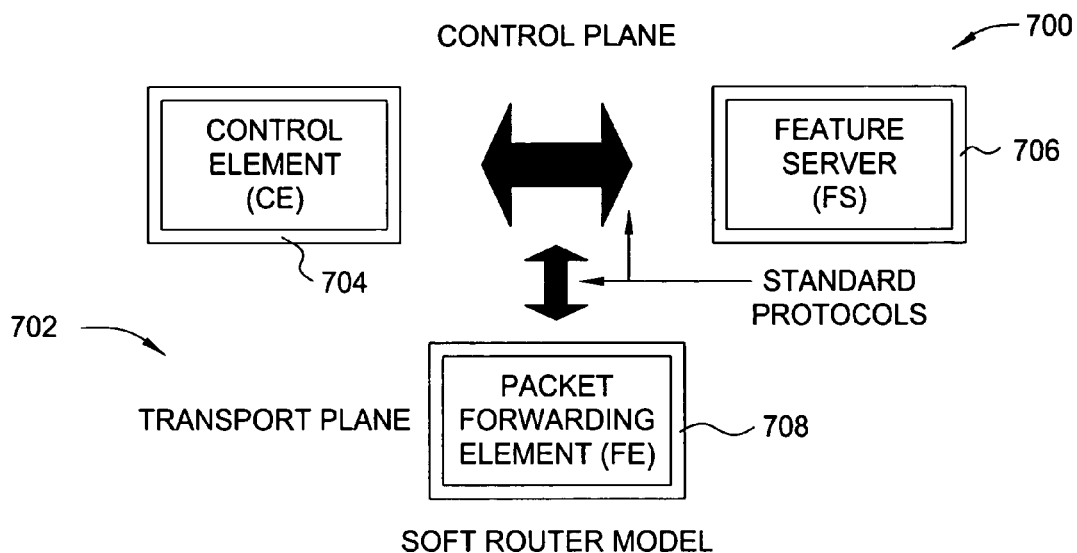
FIG. 7 is a diagram showing a high level overview of an embodiment of the exemplary SoftRouter architecture.

FIG. 7 shows a high level overview of an embodiment of the exemplary SoftRouter architecture. The control plane 700 is separate from the transport plane 702. The control plane 700 includes a CE 704 and an optional feature server (FS) 706. The FS 706 performs services, such as traffic engineering, enhanced VPN support, and security. The transport plane 702 includes a FE 706. The CE 704, FS 706, and FE 706 are connected by standard protocols.

Figure 8:
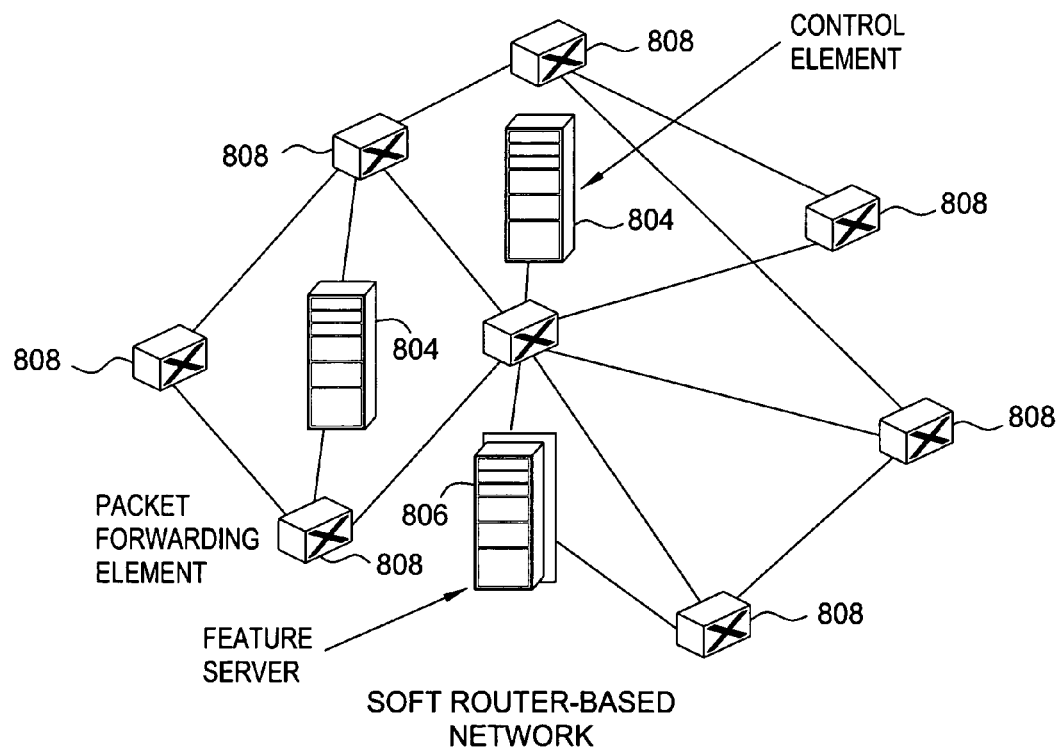
FIG. 8 is a diagram showing an embodiment of the exemplary SoftRouter architecture.

FIG. 8 shows an embodiment of the exemplary SoftRouter architecture. Two CEs 804, a FS 806, and a number of FEs 806 form a network.

Figure 9:
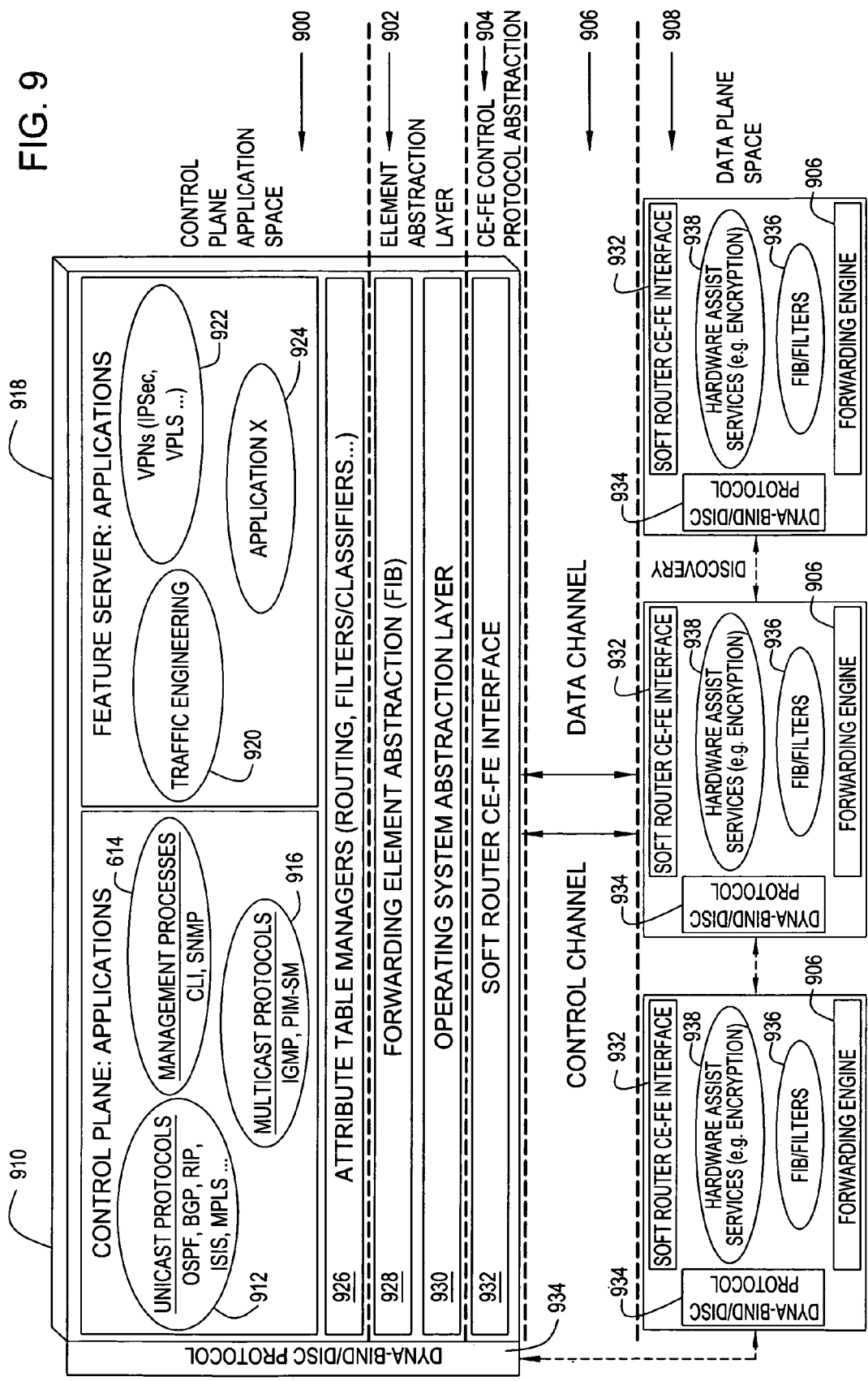
FIG. 9 is a diagram showing an exemplary software organization for the exemplary SoftRouter architecture.

FIG. 9 shows an exemplary software organization for the exemplary SoftRouter architecture. There is a control plane space 900, an element abstraction layer 902, a CE-FE control protocol abstraction 904, a control/data channel 906, and a data plane space 908.

In the control plane space 900, there are applications 910, such as unicast protocols (e.g., OSPF, BGP, routing information protocol (RIP), internal switch interface system (ISIS), and MPLS) 912, management processes (e.g., calling line identification (CLI) and signaling network management protocol (SNMP)) 914, and multicast protocols (e.g., internet group management protocol (IGMP) and protocol independent multicast, sparse mode (PIM-SM)) 916. The control plane space 900 also includes feature server application 918, such as traffic engineering 920, VPNs 922, and other applications 924. The control plane space 900 further includes attribute table managers 926, such as routing, filters, classifiers, and the like.

The element abstraction layer 902 includes a forwarding element abstraction (FIB) 928 and an operating system abstraction layer 930.

The CE-FE control protocol abstraction 904 includes a CE-FE interface 932.

The data plane space 908 includes a number of FEs 931. Each FE 931 includes a CE-FE interface 932, dynamic binding and discovery protocol 934, FIB/filters 936, hardware assist services 938, such as encryption, and a forwarding engine 935. The dynamic binding and discovery protocol 934 also spans the control plane space 900, element abstraction layer 902, and the CE-FE control protocol abstraction 904.

Figure 10:
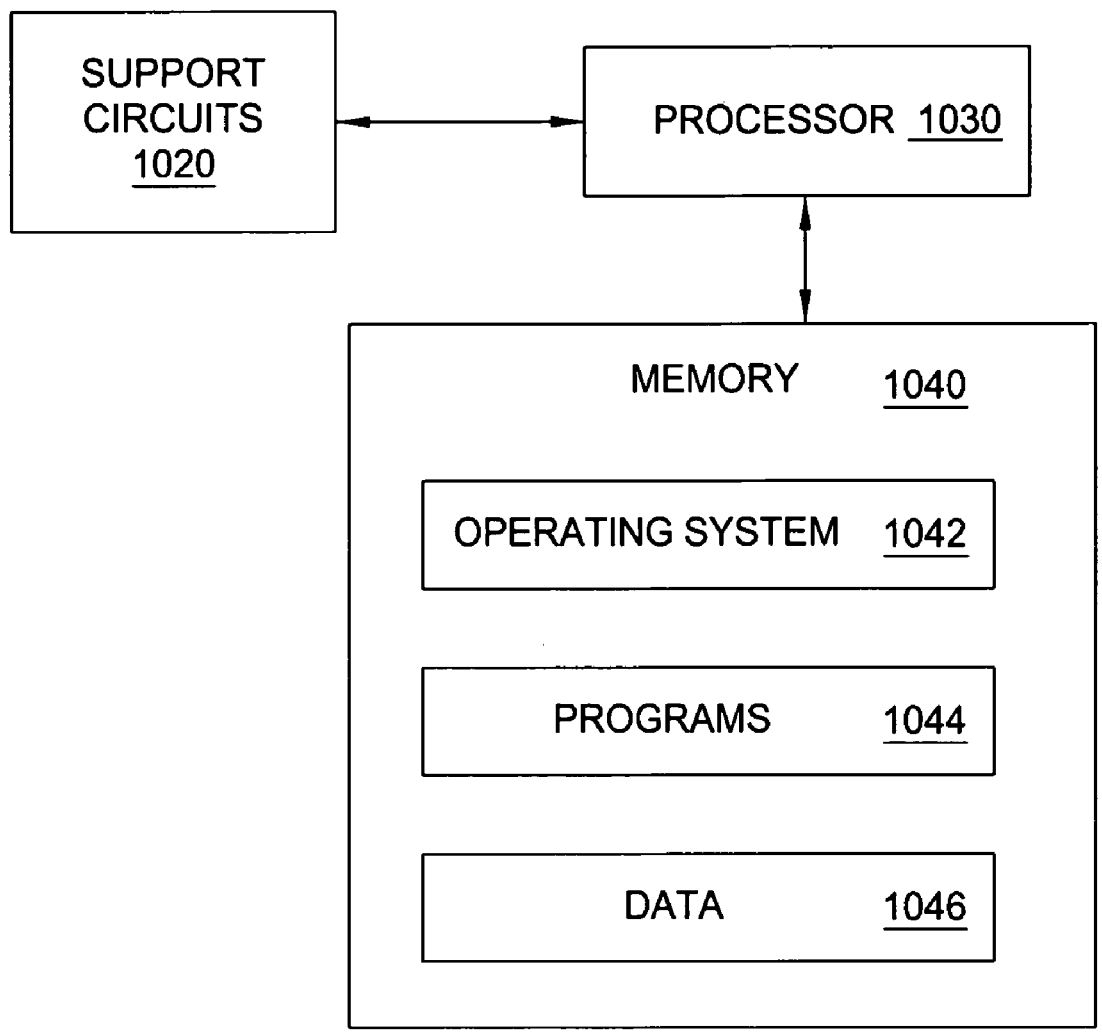
FIG. 10 is a high level block diagram showing a computer.

FIG. 10 is a high level block diagram showing a computer. The computer 1000 may be employed to implement embodiments of the present invention. The computer 1000 comprises a processor 1030 as well as memory 1040 for storing various programs 1044 and data 1046. The memory 1040 may also store an operating system 1042 supporting the programs 1044.

The processor 1030 cooperates with conventional support circuitry such as power supplies, clock circuits, cache memory and the like as well as circuits that assist in executing the software routines stored in the memory 1040. As such, it is contemplated that some of the steps discussed herein as software methods may be implemented within hardware, for example, as circuitry that cooperates with the processor 1030 to perform various method steps. The computer 1000 also contains input/output (I/O) circuitry that forms an interface between the various functional elements communicating with the computer 1000.

Although the computer 1000 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The previously described embodiments of the present invention have many advantages. Router disaggregation between forwarding and control encompasses at least three beneficial aspects: decoupling, servers, and a standard interface. First, decoupling separates complex control plan processing functions (e.g., routing protocol processing) from the packet forwarding plane. Second, control plane processing functions are implemented on dedicated external control plane servers. Third, a standard interface is defined for control plane servers to interface to FEs.

The concept of router disaggregation encourages competition, leading to decreased cost and increased innovation. Traditional routers may be replaced with callable control plane servers and inexpensive FEs. Additional benefits include a lower opex, the ease of adding new network-based functionality, increased scalability, increased reliability, and increased control plan security.

There is a lower opex because, in one embodiment of the disaggregated architecture, the FE is mostly hardware-based and requires little management. The individual router control plane management is consolidated into a few dedicated control plane servers. The reduced number of control plane elements means fewer boxes to manage, thus reducing opex.

It is easy to add new network-based functionality, because the separate control plane server facilitates the introduction of network-based functionality. Some examples of these are: support for quality of service (QoS), scaling of BGP router reflection, VPN support, and internet protocol version 6 (IPv6) deployment.

There is increased scalability, because the control plane servers can be implemented on regular computer servers and, thus, are easily scaled up using well-established server scaling techniques.

There is increased reliability, because the reduced software in a FE means it is easier to make it robust. On the control plane server side, sophisticated reliability enhancing mechanisms, such as automatic failover and overload control can be incorporated.

There is increased control plane security, because there are fewer management points. It is easier to provide a strong defense around the management points, making the overall network more secure.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A network and router architecture, comprising:
    a route controller component comprising a plurality of control elements (CEs); and a transport and packet forwarding component that is separate from the route controller, wherein the transport and packet forwarding component comprises a plurality of forwarding elements (FEs);
    wherein a discovery protocol enables each of the FEs of the transport and packet forwarding component to discover at least one CE of the route controller component, wherein each FE that is one hop away from a CE discovers the CE by listening to a status broadcast message from the CE, wherein each FE that receives a status broadcast message from a CE propagates the broadcast message to its neighbors, wherein each propagated broadcast message includes a source-route to the CE from which the broadcast message originated, wherein each FE selects one of the discovered CEs based on the source-route information associated with the CEs;
    wherein a binding protocol binds the route controller component to the hardware-based transport and packet forwarding component; wherein each FE of the transport and packet forwarding component is dynamically bound to the selected one of the CEs discovered by the FE using the discovery protocol;
    wherein, once binding is established, the route controller component communicates with the hardware-based transport and packet forwarding component via a control protocol.

2. The network and router architecture of claim 1, further comprising:
    a feature server for performing traffic management.

3. The network and router architecture of claim 1, wherein the control protocol is a standard protocol.

4. The network and router architecture of claim 1, wherein the router controller component is software-based and the transport and packet forwarding component is predominantly hardware-based.

5. The network and router architecture of claim 1, wherein the transport and packet forwarding component is physically separate from the route controller.

6. The network and router architecture of claim 1, wherein at least one CE is multiple hops away from at least one FE.

7. The network and router architecture of claim 1, wherein a network element is formed using dynamic binding between the CEs and the FEs.

8. The network and router architecture of claim 1, wherein the CEs are logically separate from the FEs.

* * * * *